United States Patent [19]

Farmer

[11] 4,334,643
[45] Jun. 15, 1982

[54] GOOSE DECOY BACK PACK

[76] Inventor: Thomas E. Farmer, P.O. Box 748, Galveston, Tex. 77553

[21] Appl. No.: 168,936

[22] Filed: Jul. 11, 1980

[51] Int. Cl.³ .................... A01M 31/06; A45F 3/04
[52] U.S. Cl. ............................... 224/153; 43/3; 224/210
[58] Field of Search ............ 224/151, 153, 211, 907, 224/213, 263, 209, 264, 210; 150/1.5 R; 46/11, 1 L, 111; D9/317; 43/3; 190/1

[56] References Cited

U.S. PATENT DOCUMENTS

| | | | |
|---|---|---|---|
| 1,127,820 | 2/1915 | Strong | 46/11 X |
| 2,771,700 | 11/1956 | Renwick, Jr. | 43/3 |
| 2,947,104 | 8/1960 | Johnson et al. | 43/3 |
| 3,029,541 | 4/1962 | Palmer | 43/3 |
| 3,321,120 | 5/1967 | Cunningham | 224/245 X |
| 3,470,645 | 10/1969 | Mattson | 43/3 |
| 3,856,191 | 12/1974 | Pohl | 224/153 |
| 3,950,879 | 4/1976 | Kwako | 43/3 |
| 4,172,335 | 10/1979 | Farmer | 43/3 |

FOREIGN PATENT DOCUMENTS

| | | | |
|---|---|---|---|
| 241684 | 10/1910 | Fed. Rep. of Germany | 224/210 |
| 277745 | 8/1913 | Fed. Rep. of Germany | 224/209 |
| 588533 | 11/1933 | Fed. Rep. of Germany | 224/153 |

Primary Examiner—Allan N. Shoap
Attorney, Agent, or Firm—Howard I. Podell

[57] ABSTRACT

A back pack for carrying a plurality of stacked goose decoys in the disassembled condition to enable a hunter to easily carry a supply of the decoys for field use. The back pack is in the form of an inverted hollow conic section, open at the top only with a pair of spaced flat bars, each parallel to the axis of the conic section, fixed to each other and to the conic section and located at a spaced distance from the conic section. Padding is fixed to the exterior of each bar so that it may comfortably rest against the back of the user. A flexible harness unit is attached to each of two spaced points on each bar and shaped so as to fit about each shoulder and the chest of a user, when the back pack is worn. The back pack, when rested on the bars in the empty condition on the ground serves itself as the body of a decoy, to which a detachable head unit may be fixed.

6 Claims, 11 Drawing Figures

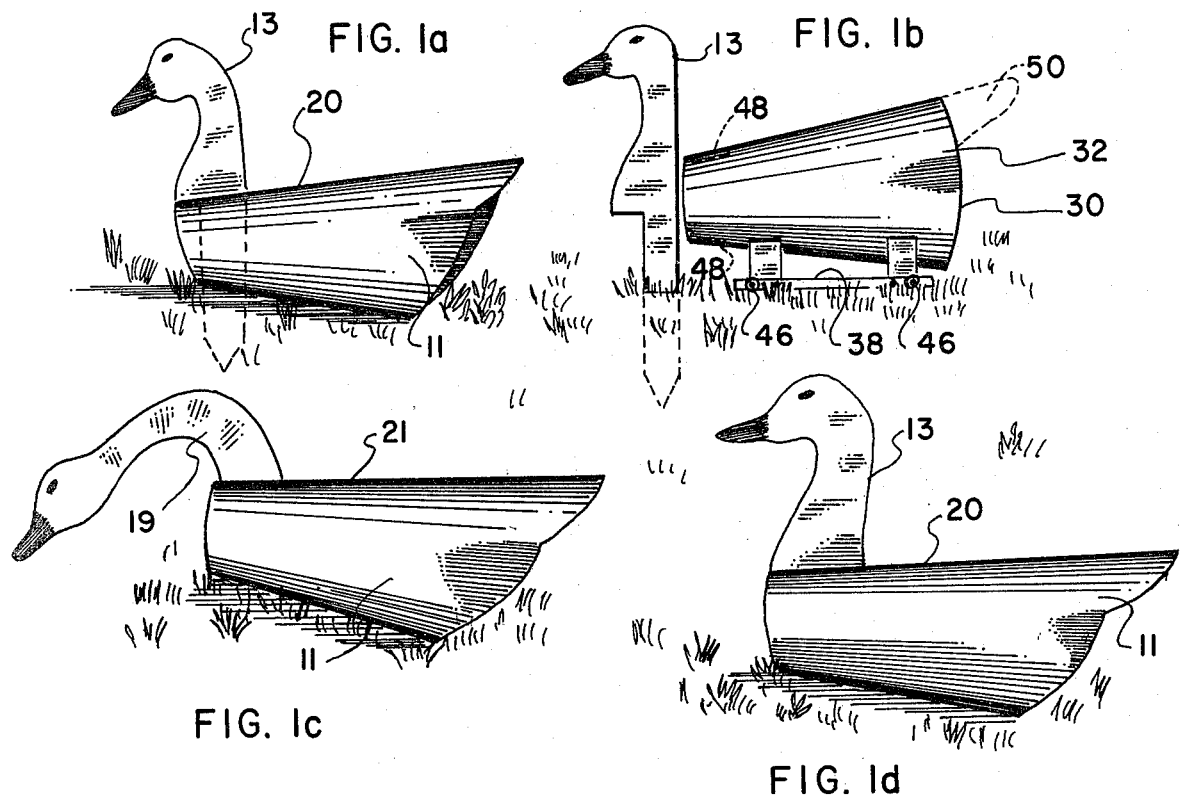
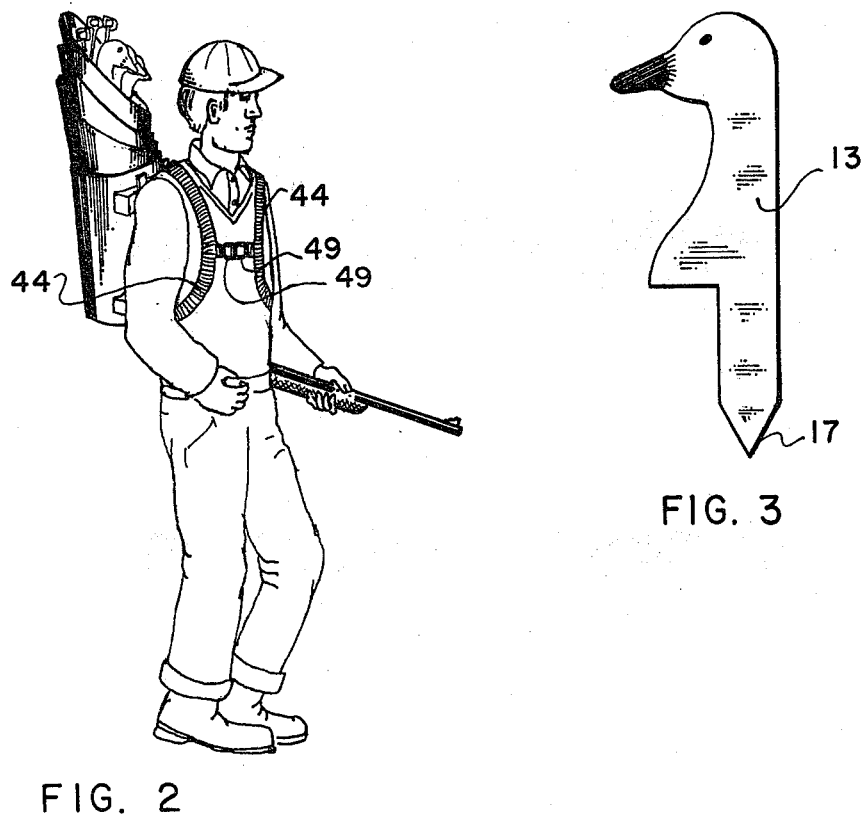

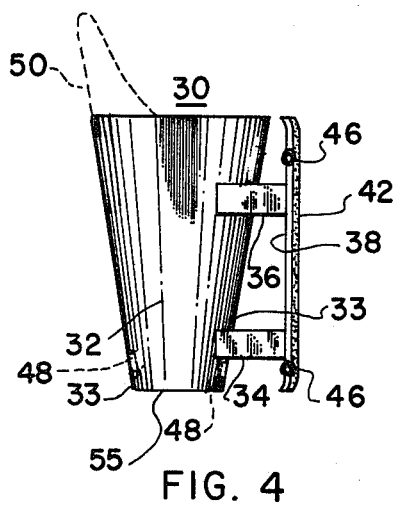
FIG. 4
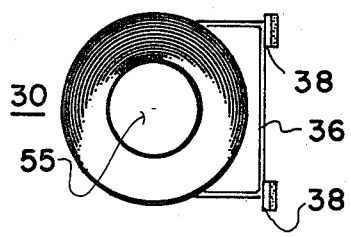
FIG. 5
FIG. 5
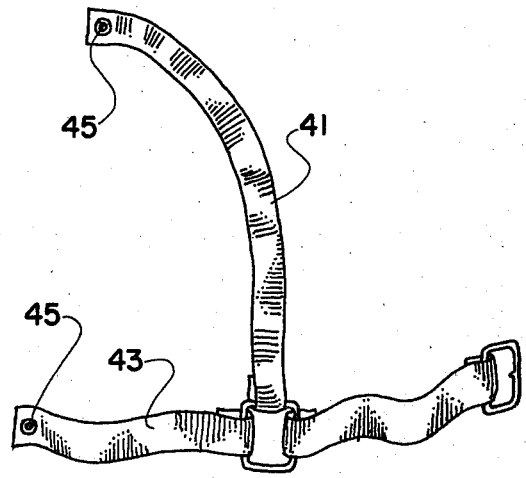
FIG. 7
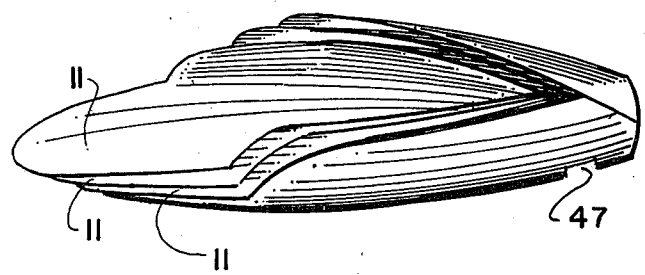
FIG. 6
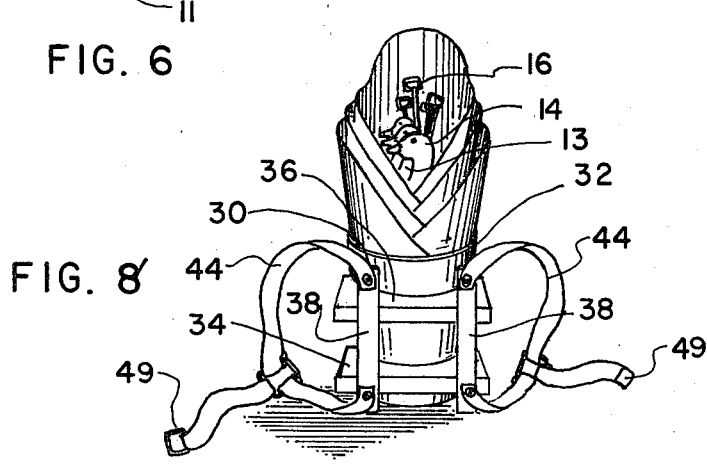
FIG. 8

GOOSE DECOY BACK PACK

BACKGROUND OF THE INVENTION

U.S. Pat. No. 4,172,335 by the same applicant describes a series of nestable units which may each be assembled to form a goose decoy when staked into ground, and which may be carried in a quiver slung over a shoulder of the user. Other disassemblable goose decoy units are disclosed in U.S. Pat. Nos. 1,316,566; 3,470,645; 2,639,534; 2,755,588; 3,245,168; 282,851; 2,947,104; and 3,029,541. None of the inventions disclose a back pack carrier for such nested goose decoy units which is shaped to also serve as a decoy itself.

SUMMARY OF THE INVENTION

My invention is a back pack for carrying a plurality of stacked goose decoys in the disassembled condition to enable a hunter to easily carry a supply of the decoys for field use. The back pack is in the form of an inverted hollow conic section, open at the top only with a pair of spaced flat bars, each parallel to the axis of the conic section, fixed to each other and to the conic section and located at a spaced distance from the conic section. Padding is fixed to the exterior of each bar so that it may comfortably rest against the back of the user. A flexible harness unit is attached to each of two spaced points on each bar and shaped so as to fit about each shoulder and the chest of a user, when the back pack is worn. The back pack, when rested on the bars in the empty condition on the ground serves itself as the body of a decoy, to which a detachable head unit may be fixed.

A number of goose decoys may be stacked, one within-the-other and carried in the back pack.

When the decoys are emptied from the back pack, the back pack itself serves as an additional decoy.

BRIEF DESCRIPTION OF THE DRAWINGS

The objects and features of the invention may be understood with reference to the following detailed description of an illustrative embodiment of the invention, taken together with the accompanying drawings in which:

FIGS. 1(a)-1(d) are perspective views of the invention employed, when empty, as decoy units;

FIG. 2 is a perspective view of the invention in use as a back pack carrier of goose decoy units;

FIG. 3 is an elevation view of a stake and head unit of a decoy;

FIG. 4 is a side view of the invention;

FIG. 5 is a plan view of the invention;

FIG. 6 is a perspective view of several body sections of the decoys stacked together;

FIG. 7 is a detail side view of the strap of the invention; and

FIG. 8 is a perspective view of the invention, complete with stacked decoy units.

DESCRIPTION OF THE PREFERRED EMBODIMENT

Turning now descriptively to the drawings, in which similar reference characters denote similar elements throughout the several views, FIGS. 1(a)-1(d) illustrates goose decoys 20 and 21 in use. The decoys are formed of a hollow sheet material body section 11 that is bent as a partial conic surface. As shown in FIG. 6, several such body sections 11 may be stacked together.

A separate head unit 13 is detachably mounted through a slot 47 in a body section 11 so as to project above the body section. As shown in FIG. 3, the head unit 13 may be formed with a pointed bottom tip 17 to serve so that the unit 13 may be staked into the ground. Head units may be of various shape, such as unit 19. Alternatively, head units 14 may be of a shape to be detachably fitted to the body sections 11 by a stake rod 16.

Body sections 11 are of a similar size and shape so that they nest one-within-the-other as shown in FIG. 6, and within the conic section shaped container 32 of back pack unit 30, with preferably the conic sections of all decoy body sections 11 and of container 32 being substantially of a similar conical shape with respect to the profile angle of opposed conical generated element lines 33. The body section of container 32 is formed with a flat solid circular bottom plate 55 so that the container 32 may hold small accessories as desired.

Container 32 is fixed to two spaced transverse members 34, 36, each joined to two spaced longitudinal flat bars 38 that extend away from members 34, 36 in the direction opposite to the container body 32. Padding 42 is fixed along the external surface of each bar 38 along its length. Preferably bars 34, 36 are parallel to each other and to the axis of the conical section of container 32.

A pair of shaped straps 44 are detachably fitted by mating fasteners 45, on strap sections 43, 41 to fasteners 46 on the opposed end sections of each bar 38. A front end of each strap section 43 is formed with a buckle unit 49, with one buckle unit 48 shaped so as to matingly detachably engage the other buckle unit, when the straps fasten the back pack 30 against the back of the user as shown in FIG. 2.

As shown in FIG. 8, the device may be rested on the ground in the vertical position of the axis of the container for ease in removing staked bodies and sections of the decoys.

As shown in FIG. 1(b), the empty unit may be rested on the bars in a free-standing horizontal orientation so that the device serves as a body section of a decoy, with a head unit 13 mounted either adjacent to the bottom end of the container 32 as shown, or with a head unit fastened through a slot 48 shown in dash lines in FIGS. 1(b) and 4. FIGS. 1(a), 1(c), and 1(d) show the head unit inserted through the slot 48.

Thus, the back pack container of goose decoys, itself, serves as an additional goose decoy. To increase the resemblance of the container body to that of a goose decoy body, the wider (rear or upper) end of the container body 32 may be fitted with a tail projection section 50 as shown in dash lines in FIGS. 1(b) and 4.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A back pack device for storing and transporting a plurality of goose decoy units, comprising a back pack unit which is of a size and shape to serve as a body of a goose decoy unit in a free-standing position, together with a head unit that serves as a head section of a said goose decoy unit, in which the back pack unit is formed with a container body in the form of a section of sheet, rolled substantially in the shape of a conic section, with said container body open at least at the larger end of said conic section, and in which a pair of longitudinally extending spaced apart bars are mounted externally to the container body via spacer means so that each of said bars extends substantially parallel to the axis of the conic section of the container body at a distance from the container body, so as to serve as back pack supports.

2. The invention as recited in claim 1 in which said head unit is fitted with stake means to detachably fasten into the ground adjacent to a free-standing back pack unit, and said back pack unit is fitted with slot means so that a said head unit may be fastened through said slot means into the ground so as to anchor the back pack unit in a given position.

3. The combination as recited in claim 1, in which strap means are fitted to each of said bars.

4. The combination as recited in claim 1, in which a pad is fixed externally to each of said bars.

5. A back pack unit of a size and shape adaptable for containment and for transporting of a plurality of housed goose decoy units and having means associated therewith for being carried on a person's back, and which itself is of a size and shape to serve as a body of a goose decoy unit in a free-standing position, together with a separate head unit that serves as a head section of a said goose decoy unit, in which a lower section of the head unit is shaped with mounting means of a shape adaptable to detachably fasten to the back pack unit so that when the head unit is so fastened, the head unit and back pack resembles a goose decoy in a free-standing position of the back pack unit, with said mounting means in the form of a pointed stake of a shape adaptable to be fastened into the ground adjacent a free-standing back pack unit such that the staked head unit and the back pack unit resembles said goose decoy, with the head located at a spaced distance from the back pack unit.

6. The combination as recited in claim 5, in which the back pack unit is formed with a container body in the form of a section of sheet rolled substantially in the shape of a conic section, with said body open at least at the larger end of said conic section.

* * * * *